United States Patent
Happ et al.

(10) Patent No.: US 9,850,954 B2
(45) Date of Patent: Dec. 26, 2017

(54) BEARING ARRANGEMENT COMPRISING AN OPTIMIZED SEALING RING WITH SEALING ELEMENT

(71) Applicant: Schaeffler Technologies AG & Co. KG, Herzogenaurach (DE)

(72) Inventors: Alexander Happ, Hofheim (DE); Wilhelm Walter, Dittelbrunn/Hambach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/308,278

(22) PCT Filed: Mar. 31, 2015

(86) PCT No.: PCT/DE2015/200237
§ 371 (c)(1),
(2) Date: Nov. 1, 2016

(87) PCT Pub. No.: WO2015/185047
PCT Pub. Date: Dec. 10, 2015

(65) Prior Publication Data
US 2017/0082146 A1 Mar. 23, 2017

(30) Foreign Application Priority Data
Jun. 5, 2014 (DE) .................. 10 2014 210 732

(51) Int. Cl.
*F16C 33/78* (2006.01)
*F16C 33/76* (2006.01)
(Continued)

(52) U.S. Cl.
CPC ........ *F16C 33/7823* (2013.01); *F16C 19/186* (2013.01); *F16C 33/768* (2013.01);
(Continued)

(58) Field of Classification Search
CPC .. F16C 19/186; F16C 33/7823; F16C 33/786; F16C 33/7886; F16C 35/063;
(Continued)

(56) References Cited

U.S. PATENT DOCUMENTS

| 5,042,822 A * | 8/1991 | Dreschmann | ....... F16C 33/7896 |
| | | | 277/353 |
| 6,267,509 B1 * | 7/2001 | Morimura | ........... F16C 33/7886 |
| | | | 324/174 |

(Continued)

FOREIGN PATENT DOCUMENTS

| EP | 2334939 B1 * | 4/2013 | ......... B60B 27/0005 |
| JP | 2002174256 | 6/2002 | |

(Continued)

*Primary Examiner* — Marcus Charles
(74) *Attorney, Agent, or Firm* — Volpe and Koenig, P.C.

(57) ABSTRACT

A bearing arrangement for a wheel hub of a motor vehicle, which wheel hub can be driven by a rotary joint. In the bearing arrangement, the wheel hub, which is connected to a wheel flange, and the rotary joint, which is connected to a drive shaft, are connected for conjoint rotation to one another and to a double-row rolling element bearing mounted on the wheel hub, the rolling element bearing having at least one separate inner bearing ring which is arranged axially outward, points towards the rotary joint, and which is axially pretensioned by a collar of the wheel hub impinging on an end face of the inner bearing ring. A sealing ring made of sheet metal rests on the inner bearing ring, and includes a sealing element that rests sealingly on the rotary joint. The sealing element has a sealing lip provided with a plurality of recesses, distributed uniformly in the circumferential direction on the sealing lip and are separated from one another by bars in order to achieve a reduced friction between the sealing lip and the rotary joint when the sealing ring is slid onto the rotary joint.

10 Claims, 2 Drawing Sheets

(51) Int. Cl.
*F16C 19/18* (2006.01)
*F16J 15/32* (2016.01)
*F16J 15/3252* (2016.01)
*F16J 15/3268* (2016.01)
*F16J 15/3216* (2016.01)
*F16C 35/063* (2006.01)
*B60B 27/00* (2006.01)

(52) U.S. Cl.
CPC ....... F16C 33/7886 (2013.01); F16J 15/3216 (2013.01); F16J 15/3252 (2013.01); F16J 15/3268 (2013.01); B60B 27/0005 (2013.01); B60B 27/0073 (2013.01); B60B 27/0078 (2013.01); F16C 35/063 (2013.01); F16C 2240/30 (2013.01); F16C 2240/40 (2013.01); F16C 2326/02 (2013.01)

(58) Field of Classification Search
CPC .............. F16C 2240/30; F16C 2240/40; F16C 2326/02; B60B 27/005; B60B 27/0073; B60B 27/0078; F16J 15/3216; F16J 15/3252; F16J 15/3268
USPC ....... 384/477, 484, 544, 589, 504, 512–513; 277/345, 351, 397, 579, 582, 590
See application file for complete search history.

(56) References Cited

U.S. PATENT DOCUMENTS

| | | | |
|---|---|---|---|
| 7,156,399 | B2 | 1/2007 | Lou |
| 7,547,145 | B2 * | 6/2009 | Yamamoto ............ F16C 41/007 |
| | | | 324/207.25 |
| 8,393,974 | B2 | 3/2013 | Hirai et al. |

FOREIGN PATENT DOCUMENTS

| | | | | | |
|---|---|---|---|---|---|
| JP | 2006132781 | | 5/2006 | | |
| JP | 2006224692 | A * | 8/2006 | ......... | B60B 27/0005 |
| JP | 2009079675 | A * | 4/2009 | | |
| JP | 2009257549 | A * | 11/2009 | .............. | F16C 15/32 |
| JP | 2009293686 | | 12/2009 | | |
| JP | 2011064300 | A * | 3/2011 | .............. | B60B 35/18 |
| KR | 20040034833 | A * | 4/2004 | .............. | B60B 7/00 |
| WO | 2008006339 | | 1/2008 | | |
| WO | WO 2009140996 | A1 * | 11/2009 | .............. | B60B 27/00 |

* cited by examiner

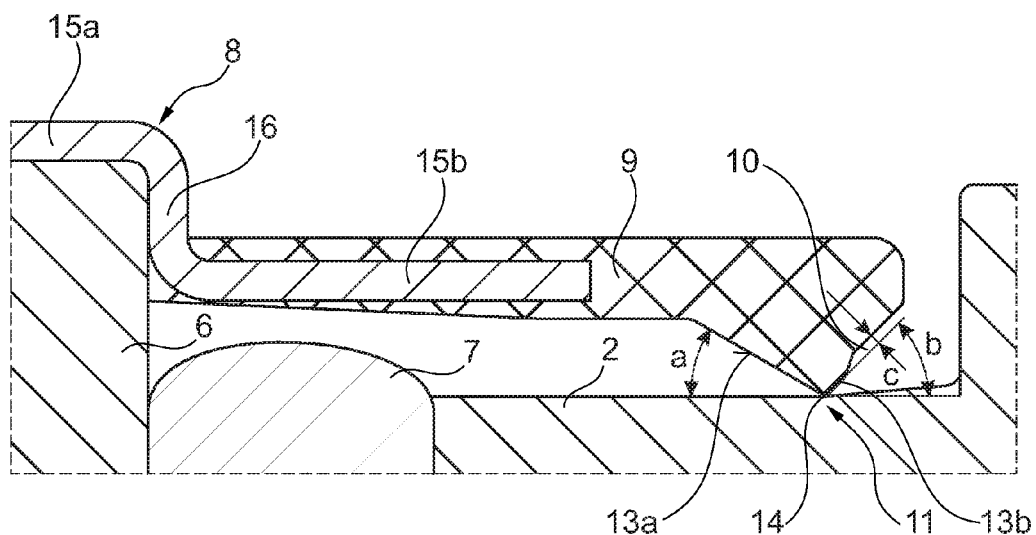
Fig. 2
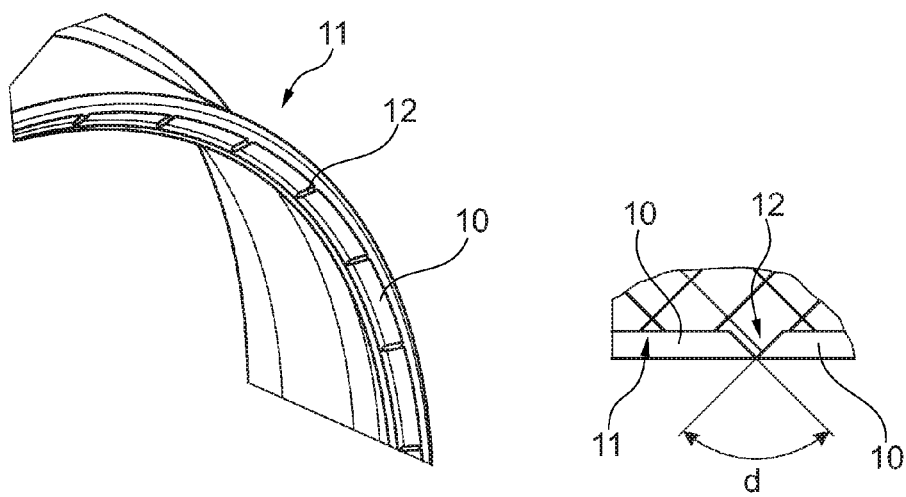
Fig. 3
Fig. 4

BEARING ARRANGEMENT COMPRISING AN OPTIMIZED SEALING RING WITH SEALING ELEMENT

CROSS-REFERENCE TO RELATED APPLICATIONS

This application is a 371 application of PCT/DE2015/200237, filed Mar. 31, 2015, which claims the benefit of German Patent Application No. 10 2014 210 732.6, filed Jun. 5, 2014.

BACKGROUND

The invention relates to a bearing arrangement for a wheel hub of a motor vehicle, wherein this wheel hub can be driven by means of a rotary joint, in which the wheel hub connected to a wheel flange and the rotary joint connected to a drive shaft are locked in rotation with each other, and with a multi-row roller bearing mounted on the wheel hub with at least one separate bearing inner ring that is arranged axially on the outside and directed toward the rotary joint and axially pretensioned by a collar of the wheel hub acting on an end face of the bearing inner ring, wherein a sealing ring made from sheet metal contacts the bearing inner ring, wherein the sealing ring comprises a sealing element that forms a sealing contact on the rotary joint in order to protect the area between the bearing inner ring, collar, and rotary joint, in particular, from moisture and dirt.

FIELD OF THE INVENTION

From EP 2 043 880 B1, a bearing arrangement for a motor vehicle is known. This comprises a wheel hub that can be driven by means of a rotary joint, wherein the wheel hub connected to a wheel flange and the rotary joint connected to a drive shaft are locked in rotation with each other by means of gearing. Furthermore, the bearing arrangement has a two-row roller bearing mounted on the wheel hub with at least one separate bearing inner ring that is arranged axially on the outside and is directed toward the rotary joint and is arranged with an axially outer end face in the area of one end of a stub axle of the wheel hub. The separate bearing inner ring is pretensioned in the axial direction by a radial surface of the wheel hub acting on the end face of the separate bearing inner ring. The outer ring and the bearing inner ring are provided with a seal that has at least one sealing ring connected to the bearing inner ring and made from sheet metal with a radial leg and an axial leg in cross section. The axial leg is locked in rotation with the bearing inner ring and directed inward in the axial direction. The axial leg of the sealing ring of the bearing inner ring is bent inward in the radial direction and outward in the axial direction, wherein a free end of the axial leg projects axially outside the end face of the bearing inner ring. Furthermore, a sealing profile that contacts at least the shoulder and/or an end edge of the joint body is formed on the end leg.

A disadvantage in the previously mentioned prior art is that, when the sealing ring is pushed onto the rotary joint, a large friction surface is created between the sealing profile and the rotary joint due to the sealing profile, which makes pushing the sealing ring onto the rotary joint harder. Furthermore, undesired folding over of the sealing profile can be produced during the disassembly of the sealing ring.

SUMMARY

Therefore, the object of the present invention is to create a bearing arrangement comprising a sealing ring with sealing element that enables a simplified assembly and disassembly of the sealing ring and prevents folding over of the sealing element.

According to the invention, the sealing element has a sealing lip provided with a plurality of recesses, wherein the recesses are distributed in the circumferential direction uniformly on the sealing lip and are separated from each other by bars, in order to reduce the friction between the sealing lip and the rotary joint when pushing the sealing ring onto the rotary joint. Here, the rotary joint does not contact the recesses, but only the sealing lip and the bars. Thus, the friction surface coming into connect with the rotary joint when the sealing ring is pushed onto the rotary joint is minimized such that it can be simply referred to as a linear contact between the sealing lip and the rotary joint.

Preferably the bars are formed essentially perpendicular to the circumferential direction of the sealing lip. However, it is also conceivable that the bars have an angle deviating by up to 45° and are therefore constructed either in the same direction or in opposite directions. The number of bars is dependent on the corresponding diameter of the sealing ring. According to one preferred embodiment, the sealing element has a total of thirty-two bars.

In addition, the recesses preferably have at least a depth of 0.1 mm and have at least a partial conical construction. Consequently, the recesses can have side surfaces that are initially straight on which a conical surface is arranged in order to prevent sharp corners.

The invention includes the technical teaching that the sealing lip has a first leg directed inward and a second leg directed outward, wherein these legs run together in the radial direction toward the rotary joint and therefore form a tip, wherein an inclination angle of the first angle formed with the horizontal is smaller than an inclination angle of the second leg formed with the horizontal. Preferably, the inclination angle of the first leg formed with the horizontal is between 15° and 45° and the inclination angle of the second leg formed with the horizontal is between 30° and 60°.

Advantageously, the bars can run together outward and either form a tip or be rounded. Here, bars running together into a tip preferably have an internal angle between 45° and 120°. The internal angle is formed at the tip of the bars.

In an especially preferred arrangement, the sealing element consists of an elastomer material and is vulcanized on the sealing ring. The sealing ring preferably is formed of a corrosion-resistant steel. Here, the sealing element partially surrounds the sealing ring. An axial section of the sealing element not surrounding the sealing ring is constructed such that sufficient flexibility for widening is given when the sealing ring is pushed onto the rotary joint, but folding over of the sealing element is prevented.

For reinforcing, the sealing ring has an essentially radial section between a first and second essentially axial section. Furthermore, the resulting "kink" in the sealing ring is used for the stable assembly of the sealing ring on the bearing inner ring.

BRIEF DESCRIPTION OF THE DRAWINGS

Additional details and features of the invention are given from the following description in connection with the drawings. Shown are.

DETAILED DESCRIPTION FOR THE PREFERRED EMBODIMENTS

Figure 1:
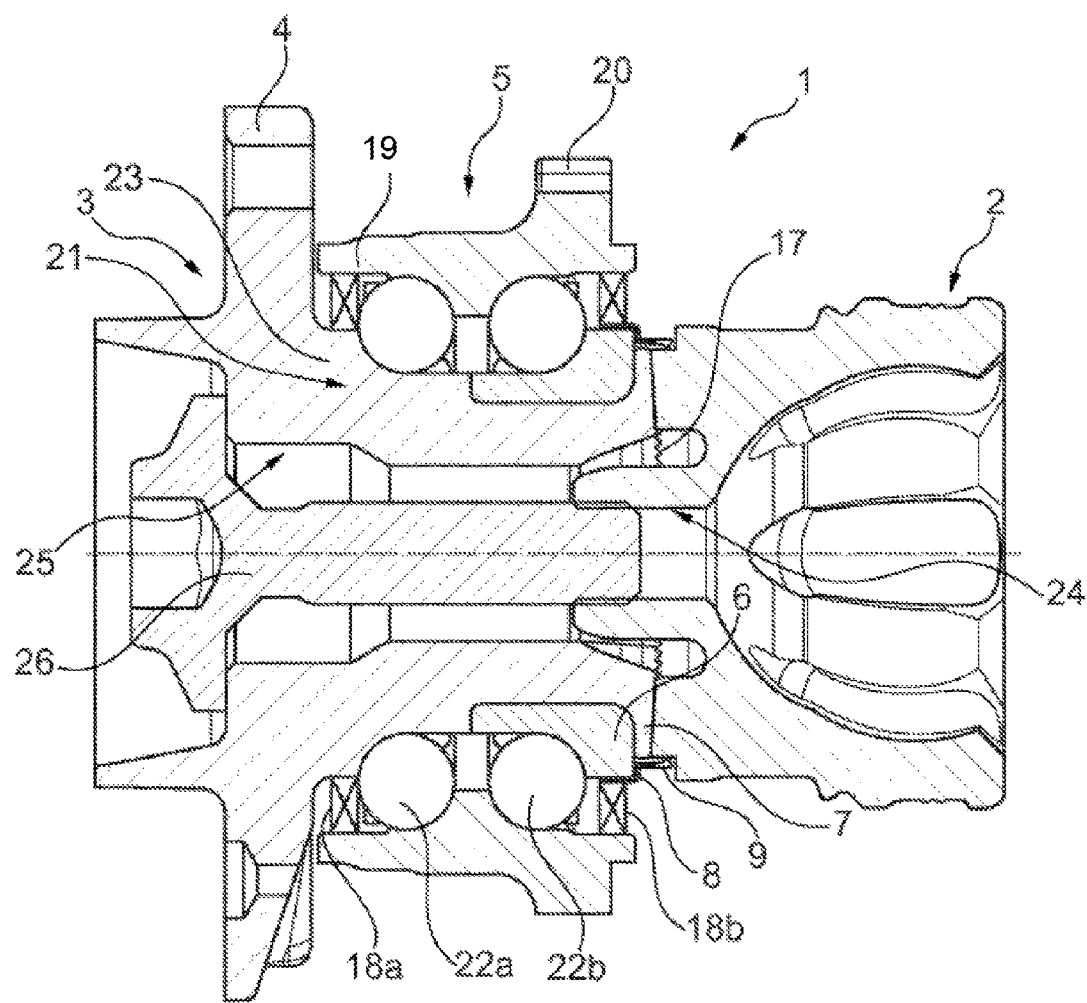
FIG. 1 a schematic section view for illustrating the layout of a bearing arrangement according to the invention for a motor vehicle, FIG. 2 a schematic section view for illustrating the layout of a sealing ring according to the invention with sealing element from FIG. 1, FIG. 3 a perspective cutout for illustrating the sealing ring shown in FIG. 2 with sealing element, and FIG. 4 a schematic section view for illustrating the recesses and bars of the sealing element from FIG. 2.

According to FIG. 1, the bearing arrangement 1 has a wheel hub 3 of a not-shown motor vehicle. The wheel hub 3 is connected to a rotary joint 2 by spur gearing 17. Different gearing between the wheel hub 3 and rotary joint 2, for example, radial gearing, is also conceivable. A pin 26 accessible from a central hole 25 of the wheel hub 3 is screwed into a hole 24 of the rotary joint 2. The wheel hub 3 also has, on one axial end, a wheel flange 4 for fastening a not-shown wheel rim and a brake disk. On the wheel hub 3 there is a two-row roller bearing 5 in the form of an angular contact ball bearing in an O arrangement which is sealed by two seals 18a, 18b against moisture and dirt. The roller bearing 5 has an outer ring 19 on which a fastening flange 20 is formed, as well as an inner ring 21. Between the outer ring 19 and inner ring 21 there are bearing balls 22a, 22b used as roller elements. The inner ring 21 consists of two bearing inner rings 23, 6, wherein the axially outer bearing inner ring 23 is formed integrally on the wheel hub 3, while the axially inner bearing inner ring 6 is a separate component that is pushed onto the wheel hub 3. The wheel hub 3 has an essentially radial collar 7 that is formed by roller rivets and is used as axial contact for the separate bearing inner ring 6. A sealing ring 8 formed of sheet metal contacts the bearing inner ring 6, wherein the sealing ring 8 comprises a sealing element 9 that forms a sealing contact on the rotary joint 2, in order to protect the area between the bearing inner ring 6, collar 7, and rotary joint 2, in particular, from moisture and dirt.

According to FIG. 2, the sealing element 9 formed of an elastomer material is vulcanized on the sealing ring 8. The sealing ring 8 has an essentially radial section 16 for reinforcement between a first and second essentially axial sections 15a, 15b. The sealing element 9 has a sealing lip 11 provided with a plurality of recesses 10, wherein the recesses 10 have a depth c of 0.1 mm. Furthermore, the recesses 10 are distributed in the circumferential direction uniformly on the sealing lip 11 and are separated from each other by bars 12, in order to reduce the friction between the sealing lip 11 and the rotary joint 2 when the sealing ring 8 is pushed onto the rotary joint 2. Here, the rotary joint 2 does not contact the recesses 10, but instead only the sealing lip 11 and the bars 12. Thus, the friction surface coming in contact with the rotary joint 2 when the sealing ring 8 is pushed onto the rotary joint 2 is minimized such that it can be simply referred to as a linear contact between the sealing lip 11 and the rotary joint 2.

Due to the longitudinal section through one of the recesses 10 of the sealing element 9, the bars 12 are not shown in FIG. 2, but these are shown in FIG. 3. The sealing lip 11 has a first inward-directed and a second outward-directed leg 13a, 13b, which run together in the radial direction toward the rotary joint 2 and therefore form a tip 14. An inclination angle a of the first leg 13a formed with the horizontal is 30° and is thus smaller than an inclination angle b of the second leg 13b formed with the horizontal, which is 45°. Here, the magnitude of the two inclination angles a, b is defined in the original state.

According to FIGS. 3 and 4, the bars 12 are formed essentially perpendicular to the circumferential direction of the sealing lip 11. Furthermore, the bars 12 run outward to form a tip and form an internal angle d of 90° at a tip. The recesses 10 between the bars 12 have a partially conical shape.

LIST OF REFERENCE NUMBERS

1 Bearing arrangement
2 Rotary joint
3 Wheel hub
4 Wheel flange
5 Roller bearing
6 Bearing inner ring
7 Collar
8 Sealing ring
9 Sealing element
10 Recesses
11 Sealing lip
12 Bars
13a, 13b Leg
14 Tip
15a, 15b Axial section
16 Radial section
17 Spur gearing
18a, 18b Seal
19 Outer ring
20 Fastener flange
21 Inner ring
22a, 22b Bearing balls
23 Bearing inner ring
24 Hole
25 Hole
a Inclination angle
b Inclination angle
c Depth
d Internal angle

The invention claimed is:

1. A bearing arrangement for a wheel hub of a motor vehicle, said wheel hub is drivable by a rotary joint, in which the wheel hub connected to a wheel flange and the rotary joint connected to a drive shaft are locked in rotation with each other, the bearing arrangement comprising a multiple-row roller bearing mounted on the wheel hub with at least one separate bearing inner ring that is arranged axially on an outside and is directed toward the rotary joint and is pre-tensioned axially by a collar of the wheel hub acting on an end face of the bearing inner ring, a sealing ring formed of sheet metal contacts the bearing inner ring, the sealing ring comprises a sealing element that forms a sealing contact on the rotary joint, in order to protect an area between the bearing inner ring, the collar, and the rotary joint, the sealing element has a sealing lip provided with a plurality of recesses, the recesses are distributed uniformly on the sealing lip in a circumferential direction and are separated from each other by bars, the recesses each partially define channels that extend to an axial end face of the sealing element, in order to reduce friction between the sealing lip and the rotary joint when the sealing ring is pushed onto the rotary joint.

2. The bearing arrangement according to claim 1, wherein the bars are formed essentially perpendicular to a peripheral direction of the sealing lip.

3. The bearing arrangement according to claim 1, wherein the recesses have at least a depth (c) of 0.1 mm.

4. The bearing arrangement according to claim 1, wherein the recesses have a conical shape at least in some sections.

5. The bearing arrangement according to claim 1, wherein the sealing lip has a first inward-directed leg and a second outward-directed leg that run together in a radial direction toward the rotary joint and form a tip, and an inclination angle (a) of the first leg formed with a horizontal is smaller than an inclination angle (b) of the second leg formed with the horizontal.

6. The bearing arrangement according to claim 5, wherein the inclination angle (a) of the first leg formed with the horizontal is between 15° and 45° and the inclination angle (b) of the second leg formed with the horizontal is between 30° and 60°.

7. The bearing arrangement according to claim 1, wherein the bars run together toward outside either to form a tip or are rounded.

8. The bearing arrangement according to claim 7, wherein the bars running together to form a tip have an internal angle (d) between 45° and 120°.

9. The bearing arrangement according to claim 1, wherein the sealing element is made from an elastomer material and is vulcanized on the sealing ring.

10. The bearing arrangement according to claim 1, wherein the sealing ring has an essentially radial section for reinforcement located between first and second essentially axial sections.

\* \* \* \* \*